United States Patent

Ogushi

Patent Number: 5,896,567
Date of Patent: Apr. 20, 1999

[54] TELEPHONE SYSTEM HAVING DISCONNECTION INFORMATION OUTPUTTING FUNCTION

[75] Inventor: Masuo Ogushi, Fukuoka, Japan

[73] Assignee: Matsushita Electric Industrial Co., Ltd., Osaka, Japan

[21] Appl. No.: 08/674,999

[22] Filed: Jul. 3, 1996

[30] Foreign Application Priority Data

Sep. 29, 1995 [JP] Japan ................. 7-253148

[51] Int. Cl.⁶ ............................ H04Q 7/32
[52] U.S. Cl. .............. 455/421; 455/403; 455/465
[58] Field of Search ................. 455/403, 405, 455/406, 414, 421, 465, 550, 563, 564

[56] References Cited

U.S. PATENT DOCUMENTS

| | | | |
|---|---|---|---|
| 5,109,401 | 4/1992 | Hattori et al. | 455/405 X |
| 5,123,043 | 6/1992 | Higashiyama et al. | 455/463 |
| 5,239,571 | 8/1993 | Takahashi | 455/564 |
| 5,499,286 | 3/1996 | Kobayashi | 455/564 |
| 5,566,236 | 10/1996 | McLampy et al. | 455/560 |
| 5,590,397 | 12/1996 | Kojima | 455/414 |
| 5,602,900 | 2/1997 | Hattori | 455/550 |
| 5,631,947 | 5/1997 | Wittstein et al. | 455/409 |
| 5,722,068 | 2/1998 | Bartle et al. | 455/421 |

*Primary Examiner*—Dwayne D. Bost
*Assistant Examiner*—William G. Trost
*Attorney, Agent, or Firm*—Venable; Robert J. Frank; Catherine M. Voorhees

[57] ABSTRACT

A wireless telephone system including a communication controlling unit for performing the line connection and line disconnection between personal stations, a timer setting unit for setting a timer to predetermined times in accordance with the line connection and the line disconnection, a timer time inputting unit inputted with the timer time of the timer, and a message transmitting unit for transmitting a message in accordance with the timer time and the line condition, whereby a communicator can make communication while grasping the present situation, thereby enabling smooth communication.

47 Claims, 16 Drawing Sheets

FIG. 14

| VALUE OF COUNTER 17 | NUMERICAL KEY → | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 0 | 2 | 3 | 4 | 5 | 6 | 7 | 8 | 9 | 0 |
| 1 | , | A | D | G | J | M | P | S | V | Y | # | # | # | # | # | # | # | # | # |
| 2 | . | B | E | H | K | N | Q | T | W | Z | # | # | # | # | # | # | # | # | # |
| 3 | - | C | F | I | L | O | R | U | X | + | a | d | g | j | m | p | s | v | y |
| 4 | (SPACE) | | | | | | | | | | b | e | h | k | n | q | t | w | z |
| | | | | | | | | | | | c | f | i | l | o | r | u | x | + |

TELEPHONE SYSTEM HAVING DISCONNECTION INFORMATION OUTPUTTING FUNCTION

BACKGROUND OF THE INVENTION

1. Field of the Invention

The present invention relates to a wireless telephone system which is capable of communicating with another wireless telephone system with no intervention of a relay by a public base station, a cell station or the like.

2. Description of the Related Art

Usually, a wireless telephone system communicates with another telephone system or wireless telephone system through a cell station or a public base station connected to a public line.

In addition, there has been increased in recent years the use of wireless telephone systems each having a transceiver mode in which direct communication is made between the wireless telephone systems.

However, a wireless telephone system mainly makes connection with a cell station or a public base station to perform communication. Many channels are used for such connection. Therefore, the number of channels allotted to permit the use in transceiver modes is small as compared with that of the channels for connection with the cell station or the public base station.

Accordingly, if a multiplicity of users make long-time communications in the transceiver modes, there may be the case where all of the channels for a transceiver mode are occupied. In such a condition, a user trying to start a new communication in a transceiver mode encounters a situation in which communication is impossible.

In order to cope with such a situation, the transceiver mode in a personal handyphone system (PHS) or the like, which is one kind of wireless telephone system, is established such that when communication is made for a first predetermined time (three minutes in the actual service), a line or circuit is automatically disconnected and the reconnection of the line is not possible during a second predetermined time (two seconds in the actual service) after the disconnection.

With such establishment, even if all of the channels for a transceiver mode are occupied when it is desired to start a new communication, the line of any the wireless telephone systems under communication in transceiver the mode is disconnected after a wait of the first predetermined time longest at the longest and the communication becomes possible through a channel which is turned into an idle condition due to this disconnection.

However, in the case where conversation is not completed in the first predetermined time in the transceiver mode, a user is obliged to wait at a minimum for the second predetermined time and to thereafter perform a calling operation again. This is troublesome.

Some of the recent wireless telephone systems realized for coping with the above situation have an automatic reconnection function. With the automatic reconnection function, a line is automatically disconnected after the lapse of a first predetermined time which is a communicable time, and a reconnecting operation is automatically performed after a second predetermined time which is subsequent to the disconnection and in which reconnection is impossible. Thereby, a user is saved from the labor and associated manipulation for a reconnection.

However, in the case of the above-mentioned wireless telephone system having the automatic reconnection function, the convenience of the saving of the labor for reconnection causes a user to neglect to complete a communication in the first predetermined time which is a continuously communicable time. Therefore, an uncommunicable time from the line disconnection until the line reconnection is yielded in the course of one's speech. As a result, a failure to hear an important matter occurs or an interruption of the speech may be generated due to the uncommunicable time.

SUMMARY OF THE INVENTION

The present invention made in light of the above-mentioned problems in the prior art is directed to a wireless telephone system having a function with which the wireless telephone system can make direct communication with another wireless telephone system and an automatic, direct communication reconnection function where, a line is disconnected after the lapse of each first predetermined time and the line is automatically reconnected after the lapse of a second predetermined time subsequent to the disconnection. An object of the present invention is to provide such a wireless telephone system which is capable of making conversation smoothly even in a communication for which the first predetermined time has been elapsed.

In order to attain the above object, the present invention provides a wireless telephone system in which a message is transmitted in accordance with a situation under communication when direct communication is made between wireless telephone systems. Therefore, even in the case where the direct communication is made between wireless telephone systems each including a changing communication situation under communication, a user can grasp the changing situation.

BRIEF DESCRIPTION OF THE DRAWINGS

FIG. 14 is a diagram showing data stored in an alphabet table section of the wireless telephone system shown in FIG. 10;

DESCRIPTION OF THE PREFERRED EMBODIMENTS

Embodiments of the present invention will now be explained by use of the accompanying drawings
(Embodiment 1)

Figure 1:
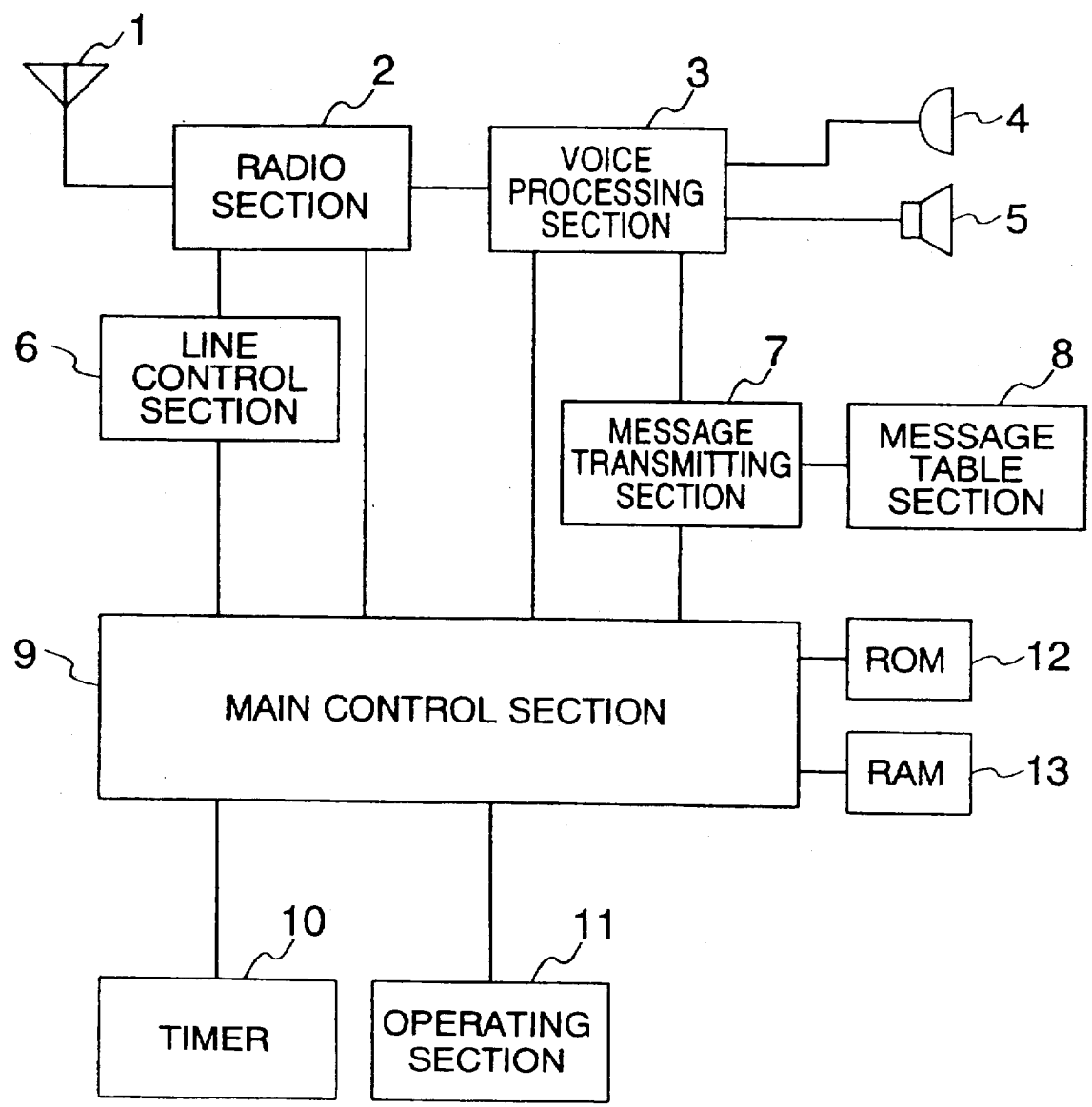
FIG. 1 is a block diagram showing the construction of a wireless telephone system according to a first embodiment of the present invention.

FIG. 1 is a block diagram showing the construction of a wireless telephone system according to a first embodiment of the present invention. In FIG. 1, reference numeral 1 denotes an antenna for transmitting and receiving electric waves, numeral 2 denotes a radio section for making the transmission and reception of a digital radio signal, numeral 3 denotes a voice processing section for A/D converting a voice signal from a microphone 4 to output the converted signal to the radio section 2 and D/A converting a digital signal received by the radio section 2 to output the converted signal to a speaker 5, numeral 6 denotes a line control section for performing line connection/disconnection on the basis of information from the radio section 2 or information from a main control section 9 (which will be mentioned later on) to perform the transmission and reception of information concerning the line connection/disconnection to and from the opposite wireless telephone system, numeral 7 denotes a message transmitting section for extracting a message from a message table section 8 in accordance with a control from the main control section 9 to transmit the extracted message to the voice processing section 3, numeral 9 denotes the main control section for making the control of the whole of the wireless telephone system, numeral 10 denotes a timer to which a time is set by the main control section 9, numeral 11 denotes an operating section for performing an operation including the inputting of a telephone number, the operation of an outgoing call and an incoming call, and so forth, numeral 12 denotes a read only memory (ROM), and numeral 13 denotes a random access memory (RAM).

Figure 2:
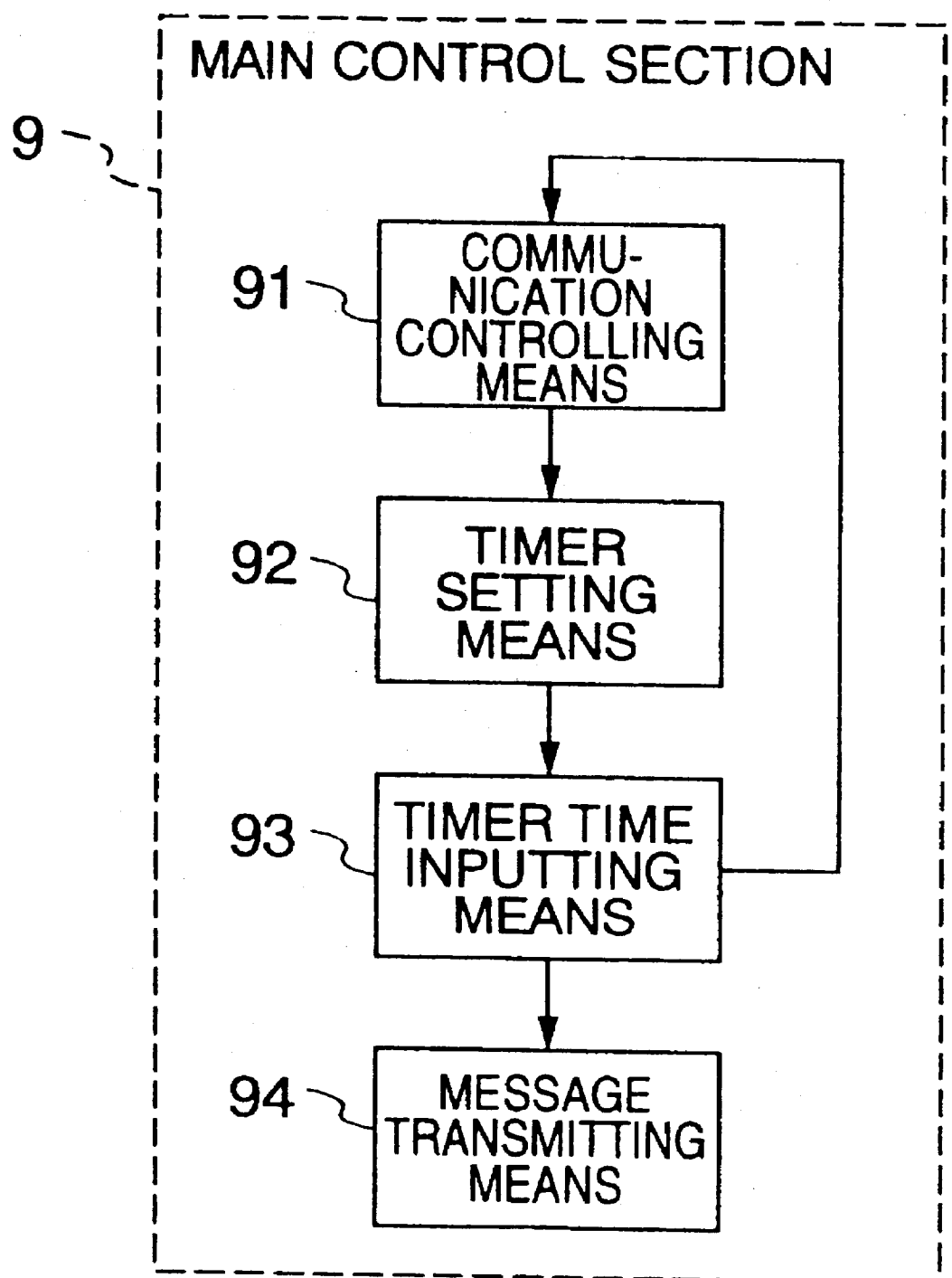
FIG. 2 is a functional block diagram showing means for realizing the function of a main control section of the wireless telephone system shown in FIG. 1.

FIG. 2 is a functional block diagram showing means for realizing the function of the main control section 9 included in the wireless telephone system shown in FIG. 1. In FIG. 2, reference numeral 91 denotes communication controlling means for performing the connection and disconnection of line between wireless telephone systems, numeral 92 denotes timer setting means for setting the timer 10 to a predetermined time, numeral 93 denotes timer time inputting means for inputting the timer time of the timer 10, and numeral 94 denotes message transmitting means for transmitting a message in accordance with a line condition or the like.

Figure 3:
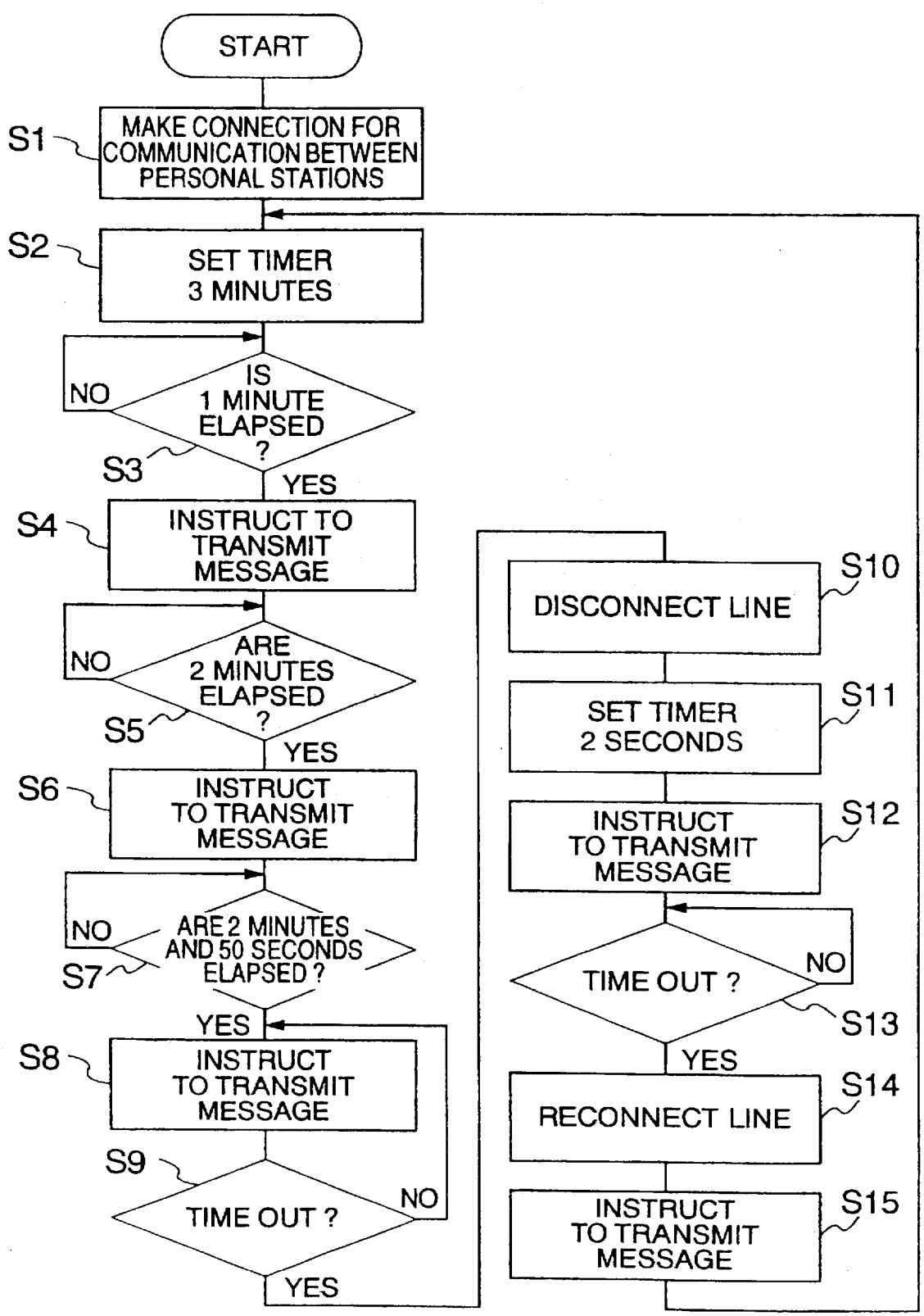
FIG. 3 is a flow chart for explaining the operation of the wireless telephone system according to the first embodiment of the present invention.

The operation of the wireless telephone system having the above construction will now be explained in conjunction with a transceiver mode in which communication is made between wireless telephone systems. FIG. 3 is a flow chart for explaining the operation of the wireless telephone system according to the present embodiment. When an operation for communication between wireless telephone systems is performed from the operating section 11, the communication controlling means 91 controls the line control section 6 so that the line control section 6 makes a control concerning the line connection for the opposite wireless telephone system to establish a line for the opposite wireless telephone system (line connecting step S1). Next, the timer setting means 92 sets the timer 10 to three minutes (or a first predetermined time) to start the timer 10 (first timer setting step S2). The timer time inputting means 93 has inputted the timer time at predetermined short intervals (for example, intervals of 0.1 seconds) to judge whether or not the timer time has the increase of one minute (or a fourth predetermined time), that is, whether or not there is the lapse of one minute after the setting of the timer 10 (step S3). When the lapse of one minute is not determined, a waiting condition is taken. When the timer time inputting means 93 determines the lapse of one minute, the message transmitting means 94 instructs the message transmitting section 7 to output a voice message indicating the lapse of one minute (step S4). Thereby, the message transmitting section 7 extracts voice message data of "ONE MINUTE ELAPSED" from the message table section 8 to output the extracted voice message data to the voice processing section 3 (first message transmitting step). The voice processing section 3 inputted with the voice message data sends the voice message to the radio section 2 and the speaker 5. At this time, a digital signal is sent to the radio section 2 and an analog signal is sent to the speaker 5. Thereby, the voice of "ONE MINUTE ELAPSED" is outputted from the speaker 5 and a similar message is also transmitted to the opposite wireless telephone system. Next, the timer time inputting means 93 judges whether or not the timer time has the further increase of one minute (or the fourth predetermined time), that is, whether or not there is the lapse of two minutes after the setting of the timer 10 (step S5). When the lapse of two minutes is not determined, a waiting condition is taken. When the timer time inputting means 93 determines the lapse of two minutes, the message transmitting means 94 instructs the message transmitting section 7 to output a voice message indicating the lapse of two minutes (step S6). Thereby, the message transmitting section 7 extracts voice message data of "TWO MINUTES ELAPSED" from the message table section 8 to output the extracted voice message data to the voice processing section 3 (first message transmitting step). The operation of the voice processing section 3 inputted with the voice message data is the same as that mentioned in the above.

Next, the timer time inputting means 93 judges whether or not it is ten seconds (or a third predetermined time) before disconnection, that is, whether or not there is the lapse of two minutes and fifty seconds after the setting of the timer 10 (step S7). When the lapse of two minutes and fifty seconds is not determined, a waiting condition is taken. When the timer time inputting means 93 determines the lapse of two minutes and fifty seconds, the message transmitting means 94 instructs the message transmitting section 7 to output a voice message indicating that the line will soon be turned into a disconnected condition (step S8). Thereby, the message transmitting section 7 extracts voice message data of "COMMUNICATION WILL SOON BE INTERRUPTED FOR TWO SECONDS" from the message table section 8 to output the extracted voice message data to the voice processing section 3 (second message transmitting step). This time of two seconds corresponds to a time from the line disconnection until the line reconnection (or a second predetermined time). The voice processing section 3 inputted with the voice message data sends the voice message to the radio section 2 and the speaker 5. At this time, a digital signal is sent to the radio section 2 and an analog signal is sent to the speaker 5. Thereby, the voice of "COMMUNICATION WILL SOON BE INTERRUPTED FOR TWO SECONDS" is outputted from the speaker 5 and a similar message is also transmitted to the opposite wireless telephone system.

Next, the timer time inputting means 93 judges whether or not the timer time of the timer 10 is out, that is, whether or not there is the lapse of three minutes (or the first predetermined time) after the setting of the timer 10 (step S9). When the lapse of three minutes is not determined, the flow returns to step S8. Thereby, the voice message of "COMMUNICATION WILL SOON BE INTERRUPTED FOR TWO SECONDS" is repeatedly outputted in a period of time from ten seconds before the line disconnection until the line disconnection (second message transmitting step). When the timer time inputting means 93 determines the lapse of three minutes, the communication controlling means 91 controls the line control section 6 to disconnect the line for the opposite wireless telephone system (line disconnecting step S10).

Next, the timer setting means 92 sets the timer 10 to two seconds (or the second predetermined time) to start the timer 10 (second timer setting step S11). The message transmitting means 94 instructs the message transmitting section 7 to output a voice message indicating the cut-off or disconnected condition of the line (step S12). Thereby, the message transmitting section 7 extracts voice message data of "COMMUNICATION IS INTERRUPTED" from the message table section 8 to output the extracted voice message data to the voice processing section 3 (third message transmitting step). The voice processing section 3 inputted with the voice message data sends the voice message to the speaker 5. (It is not possible to transmit the voice message to the opposite wireless telephone system since the line is in the disconnected condition.) Thereby, the voice of "COMMUNICATION IS INTERRUPTED" is outputted from the speaker 5.

Next, the timer time inputting means 93 judges whether or not the timer time of the timer 10 is out, that is, whether or not there is the lapse of two seconds (or the second predetermined time) after the setting of the timer 10 (step S13). When the lapse of two seconds is not determined, a waiting condition is taken. When the timer time inputting means 93 determines the lapse of two seconds, the communication controlling means 91 controls the line control section 6 to reconnect the line to the opposite wireless telephone system with which the communication was made immediately before the disconnection (reconnecting step S14). After the line reconnection, the message transmitting means 94 instructs the message transmitting section 7 to output a voice message indicating the execution of line reconnection (step S15). Thereby, the message transmitting section 7 extracts voice message data of "LINE IS RECONNECTED" from the message table section 8 to output the extracted voice message data to the voice processing section 3 (fourth message transmitting step). The voice processing section 3 inputted with the voice message data sends the voice message to the radio section 2 and the speaker 5. At this time, a digital signal is sent to the radio section 2 and an analog signal is sent to the speaker 5. Thereby, the voice of "LINE IS RECONNECTED" is outputted from the speaker 5 and a similar message is also transmitted to the opposite wireless telephone system.

According to the present embodiment mentioned above, it is possible to surely grasp the remaining time since the timer time of the timer is periodically outputted as a voice message. Also, since the notice of "COMMUNICATION WILL SOON BE INTERRUPTED FOR TWO SECONDS" (or a message indicating that the line will soon be disconnected) is given from ten seconds (or the third predetermined time) before the line disconnection, a communicator or user can make communication while considering that the line will be disconnected once. Further, since a voice message indicating the execution of line disconnection is outputted when the line disconnection is executed, it is possible for the communicator to surely know the fact that the line is being disconnected once. Also, since a voice message indicating the execution of line reconnection is outputted when the line reconnection is executed, it is possible for the communicator to know the execution of line reconnection so that the communication can be restarted smoothly. An electronic sound may be used in lieu of the voice message. In the case where the electronic sound is used, it is possible to inform the communicator of the situation of communication by changing the output form of electronic sound in accordance with the condition of communication (timer time condition, line condition and so forth), for example, by outputting "pi!" at the time of lapse of one minute, "pi!, pi!" at the time of lapse of two minutes and "pi-pi-pi-" (continuous) before ten seconds. In this case, the message table section 8 for storing voice message data becomes unnecessary, and thus, the storage capacity can be reduced greatly. In any event, a message is periodically outputted. Accordingly, in the case where the line must be disconnected periodically as between wireless telephone systems as in the transceiver mode, there is eliminated a fear that a user continues communication without knowing the disconnection occurred.

In the present embodiment, the fourth predetermined time is defined as one minute. However, the present invention is not limited to such a specific example. The fourth predetermined time can take a proper interval in accordance with the situations. Also, the notices are all given by voice messages. However, the voice message may be replaced by an electronic sound.

In the present embodiment, the third predetermined time is defined as ten seconds. However, the present invention is not limited to such a specific example.

In the present embodiment, the notice of the communication time or the remaining time until disconnection is given after the lapse of each fourth predetermined time. However, if the notice of the communication time or the remaining time until disconnection is given in accordance with a specified operation of the operating section 11, it is possible to give such a notice when an operator or user desires to know the communication time or the remaining time.

(Embodiment 2)

Figure 4:
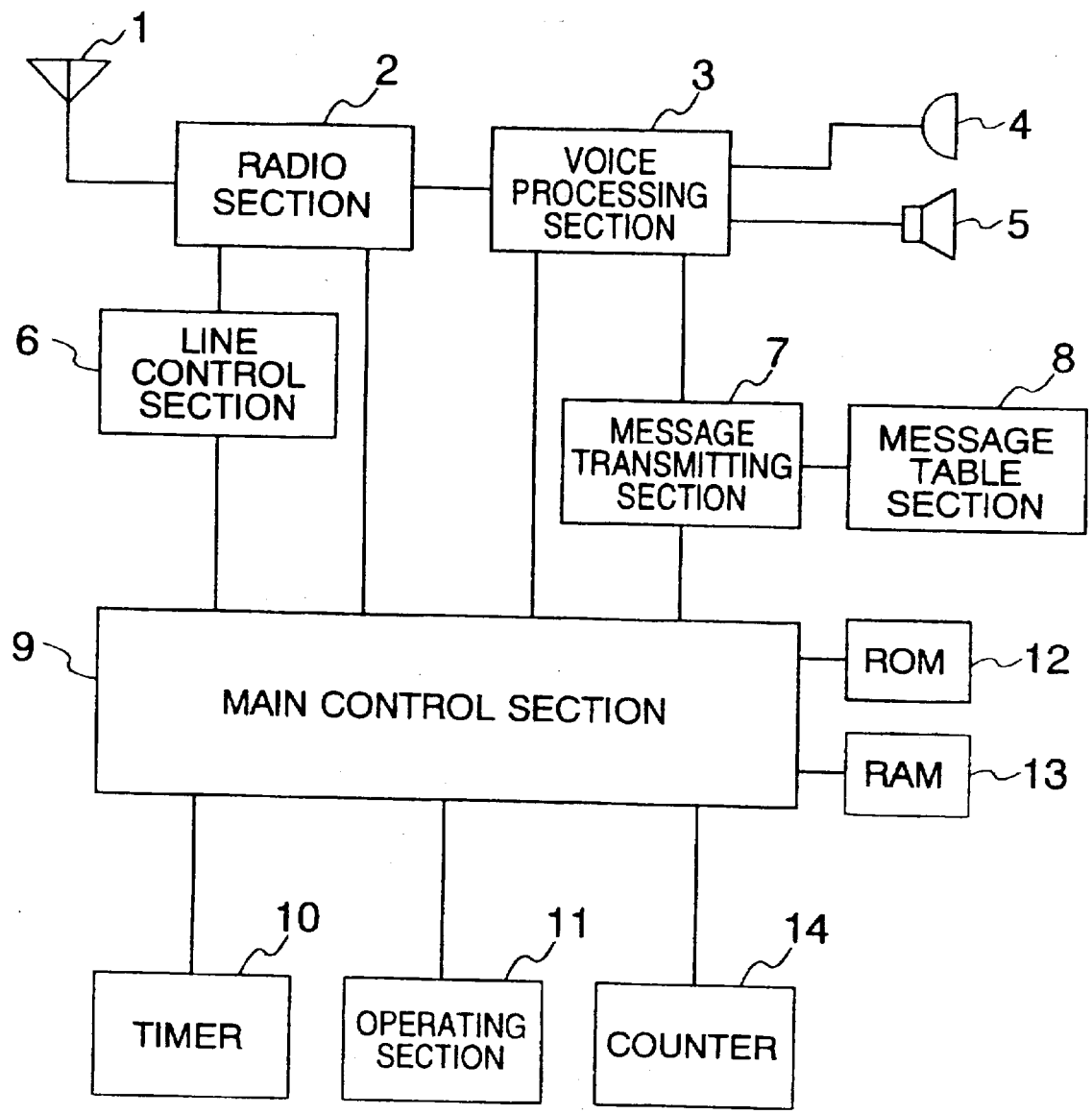
FIG. 4 is a block diagram showing the construction of a wireless telephone system according to a second embodiment of the present invention.

FIG. 4 is a block diagram showing the construction of a wireless telephone system according to a second embodiment of the present invention. In FIG. 4, reference numeral 1 denotes an antenna, numeral 2 denotes a radio section, numeral 3 denotes a voice processing section, numeral 4 denotes a microphone, numeral 5 denotes a speaker, numeral 6 denotes a line control section, numeral 7 denotes a message transmitting section, numeral 8 denotes a message table section, numeral 9 denotes a main control section, numeral 10 a timer, numeral 11 denotes an operating section, numeral 12 denotes a ROM, and numeral 13 denotes a RAM. Since these components are similar to those shown in FIG. 1, the components are denoted by the same reference numerals as those used in FIG. 1 and the explanation thereof will be omitted. Numeral 14 denotes a counter to which a count value "10" is set by an instruction from the main control section 9, the count value being thereafter decremented one by one by an instruction from the main control section 9. In the present embodiment, voice data including at least "1" to "10" and "SECONDS BEFORE" is stored in the message table section 8.

Figure 5:
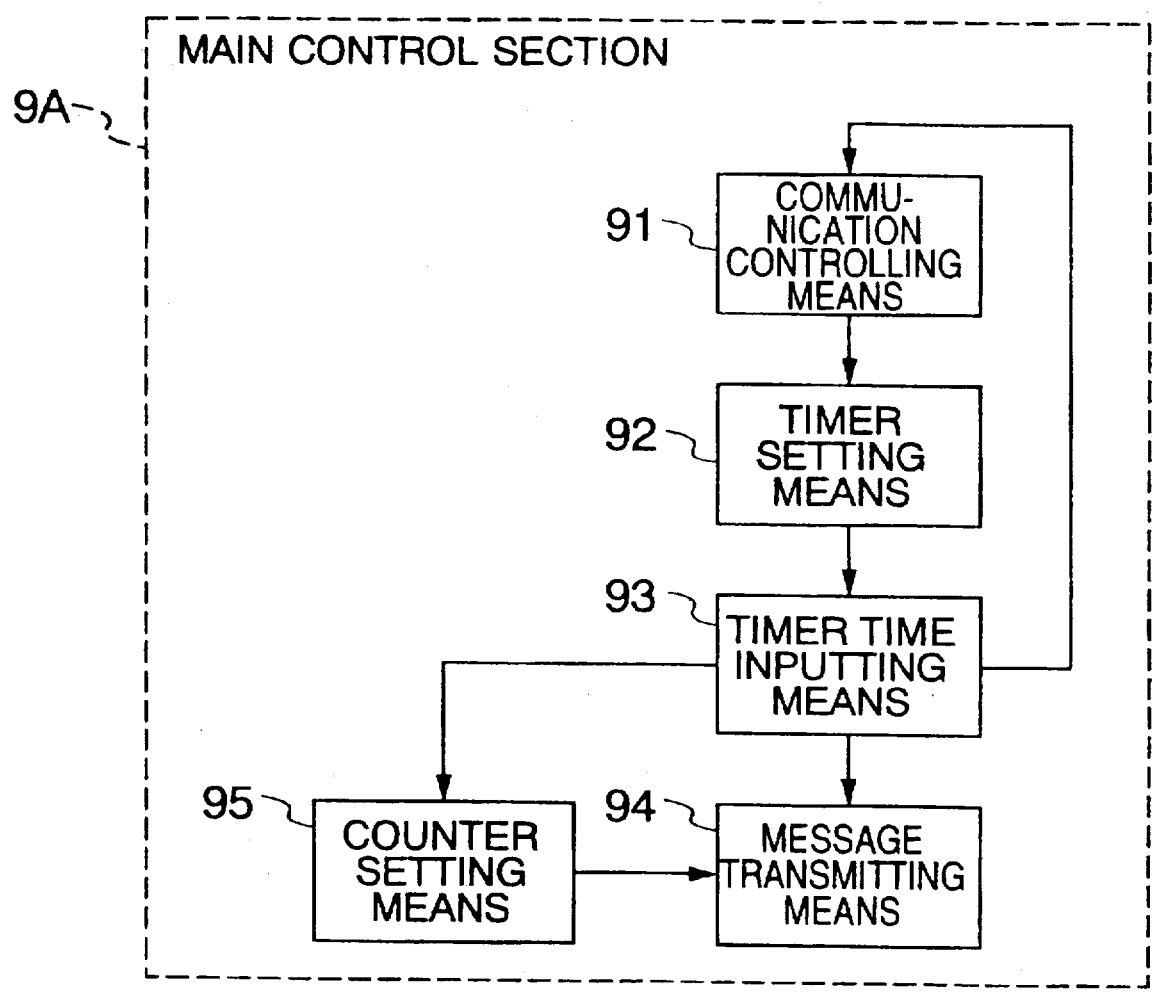
FIG. 5 is a functional block diagram showing means for realizing the function of a main control section of the wireless telephone system shown in FIG. 4.

FIG. 5 is a functional block diagram showing means for realizing the function of the main control section which forms the wireless telephone system shown in FIG. 4. In FIG. 5, reference numeral 9A denotes the main control section, numeral 91 denotes communication controlling means, numeral 92 denotes timer setting means, numeral 93 denotes timer time inputting means, and numeral 94 denotes message transmitting means. Since these components are similar to those shown in FIG. 2, the components are denoted by the same reference numerals as those used in FIG. 2 and the explanation thereof will be omitted. Numeral 95 denotes counter setting means for setting a count value of the counter 14 when the timer time of the timer 10 reaches a predetermined timer time and decreasing the count value of the counter 14 in accordance with the timer time of the timer 10.

Figure 6:
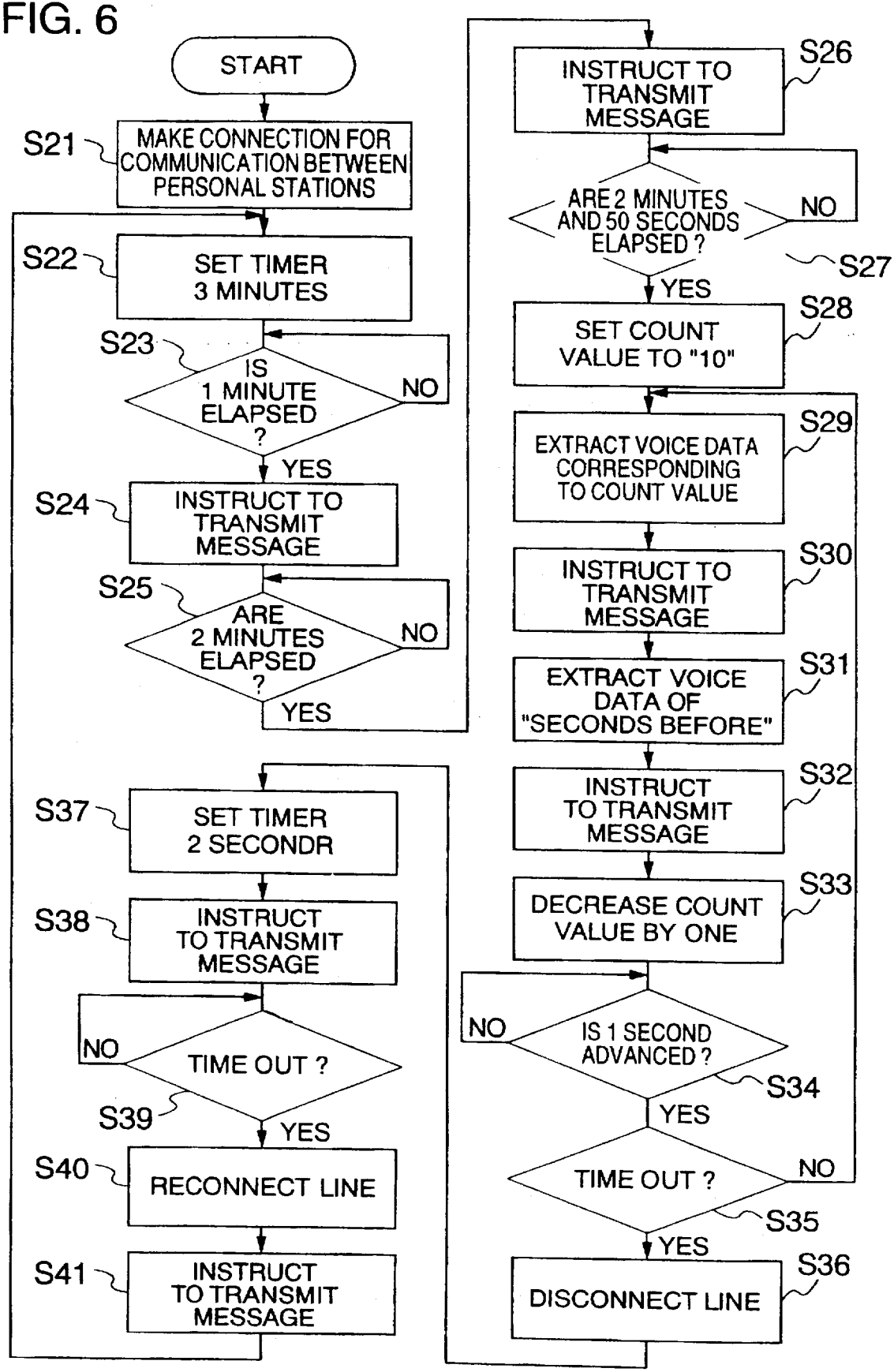
FIG. 6 is a flow chart for explaining the operation of the wireless telephone system according to the second embodiment of the present invention.

The operation of the wireless telephone system having the above construction will now be explained in conjunction with a transceiver mode in which communication is made between wireless telephone systems. FIG. 6 is a flow chart for explaining the operation of the wireless telephone system according to the present embodiment. Since steps S21 to S27 and steps S35 to S41 in FIG. 6 correspond to steps S1 to S7 and steps S9 to S15 in FIG. 3 respectively, the explanation thereof will be omitted.

When the timer time inputting means 93 determines ten seconds (or the third predetermined time) before line disconnection or the lapse of two minutes and fifty seconds after line connection (step S27), the counter setting means 95 sets the count value of the counter 14 to "10" (step S28). Next, the message transmitting means 94 instructs the message transmitting section 7 to extract voice data corresponding to the count value (voice data of "10" at this stage of time) from the message table section 8 (step S29). The message transmitting section 7 outputs the extracted voice data to the voice processing section 3 (second message transmitting step S30). Subsequently, the message transmitting means 94 instructs the message transmitting section 7 to extract voice data of "SECONDS BEFORE" from the message table section 8 (step S31). The message transmitting section 7 outputs the extracted voice data of "SECONDS BEFORE" to the voice processing section 3 (second message transmitting step S32). Since the operations of steps S30 to S32 are performed at the substantially same time, the voice data is heard by a communicator as a voice message of "10 SECONDS BEFORE". Next, the counter setting means 95 decreases the count value of the counter 14 by one to set it to "9" (count value down step S33). Then, the judgement is made of whether or not the timer 10 is advanced by one second, that is, whether or not there is the advance of one second after the lapse of two minutes and fifty seconds (count value down step S34). When it is determined that there is not the advance of one second, a waiting condition is taken. When it is determined that there is the advance of one second, the flow goes to step S35. When the timer time inputting means 93 determines in step S35 that the timer time of the timer 10 is not out (or the timer 10 has not the lapse of three minutes), the flow returns to step S29. Namely, the count value of the counter 14 is successively decreased to "9", "8", -, "1", "0" until the timer 10 has the lapse of three minutes (or the first predetermined time).

In the present embodiment, the notices are all given by voice messages. However, the voice message may be replaced by an electronic sound. Also, since the sound of "pu!, pu!, pu!, puun!" as the announcement of time in television, radio or the like is familiar, there can be used a method in which the notice is given by such an electronic sound after the lapse of every one second from ten seconds before line disconnection and a notice using a voice message of "DISCONNECTED" is given when the line is disconnected. Inversely, there may also be used a method in which a voice message of "SOON DISCONNECTED" is given ten seconds before disconnection and is followed by the announcement of time.

According to the present embodiment mentioned above, the count-down is made from ten seconds before line disconnection. Therefore, an instant of time reaching the interruption caused by the line disconnection can be grasped more accurately. Also, in the case where both of an electronic sound and a voice message are used, as mentioned above, it is possible to give a notice which is comprehensible as compared with the case where only an electronic sound is used. Further, the storage capacity can be reduced as compared with the case where only an electronic sound is used.

(Embodiment 3)

Figure 7:
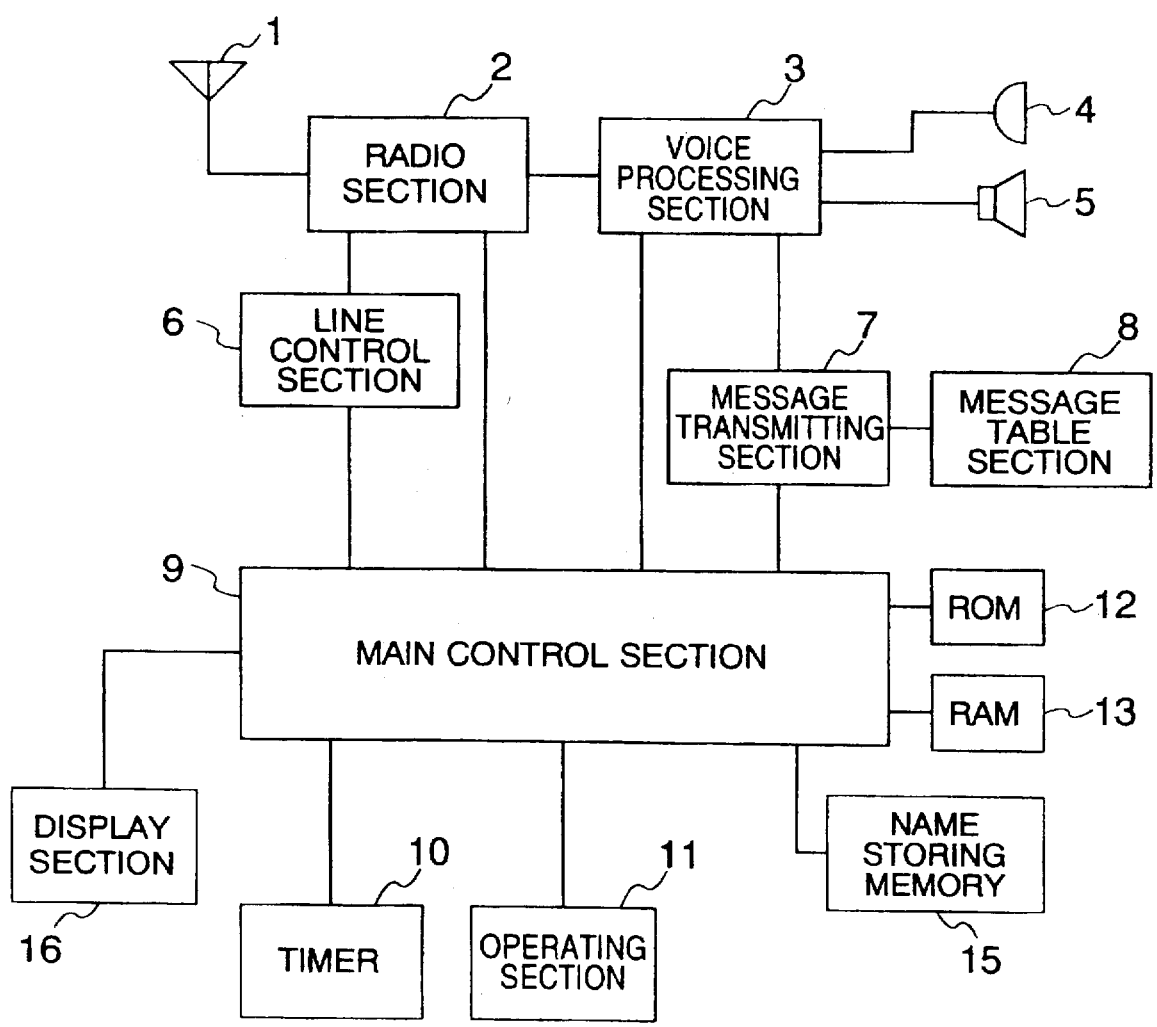
FIG. 7 is a block diagram showing the construction of a wireless telephone system according to a third embodiment of the present invention.

FIG. 7 is a block diagram showing the construction of a wireless telephone system according to a third embodiment of the present invention. In FIG. 7, reference numeral 1 denotes an antenna, numeral 2 denotes a radio section, numeral 3 denotes a voice processing section, numeral 4 denotes a microphone, numeral 5 denotes a speaker, numeral 6 denotes a line control section, numeral 7 denotes a message transmitting section, numeral 8 denotes a message table section, numeral 9 denotes a main control section, numeral 10 denotes a timer, numeral 11 denotes an operating section, numeral 12 a ROM, and numeral 13 denotes a RAM. Since these components are similar to those shown in FIG. 1, the components are denoted by the same reference numerals as those used in FIG. 1 and the explanation thereof will be omitted. Numeral 15 denotes a name storing memory for storing names, and numeral 16 denotes a display section for displaying a message inclusive of a name at the time of reconnection.

Figure 8:
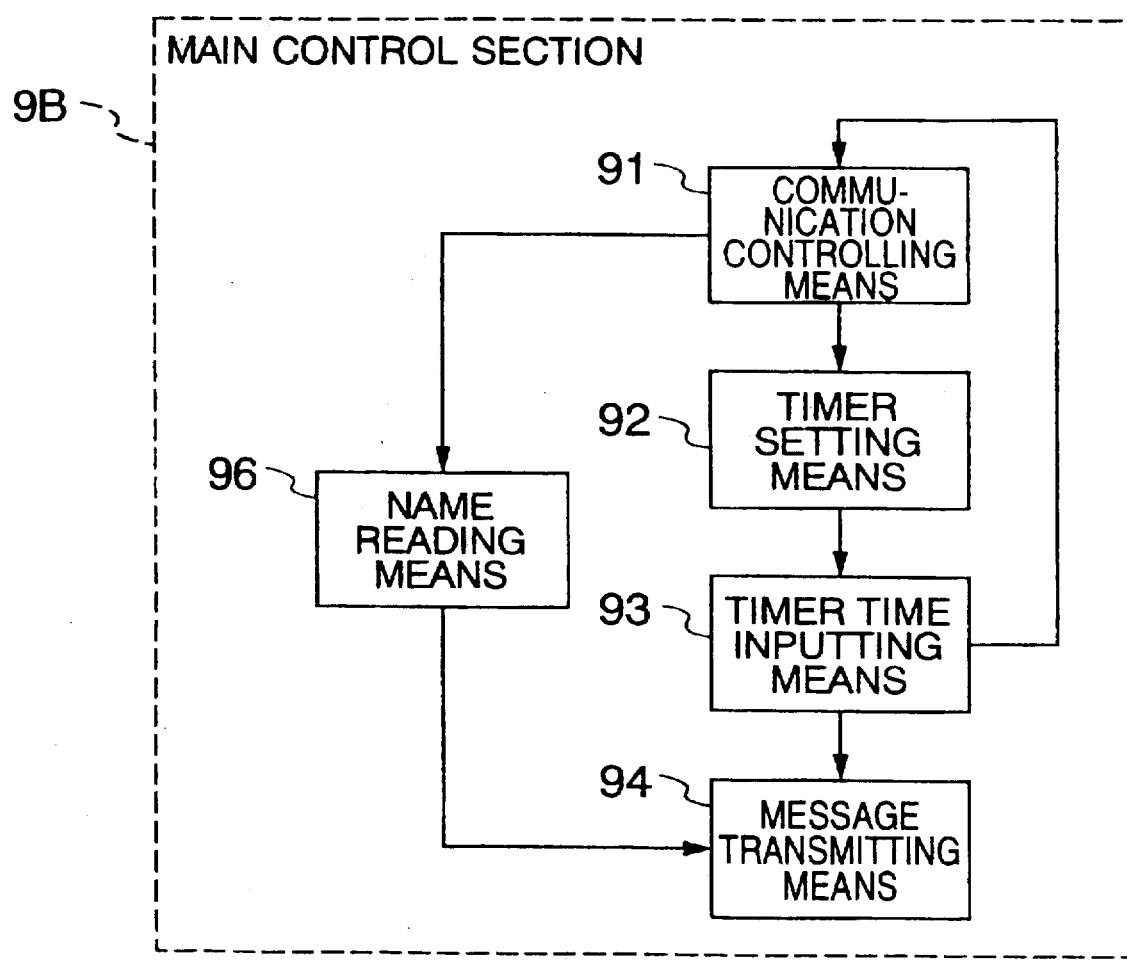
FIG. 8 is a functional block diagram showing means for realizing the function of a main control section of the wireless telephone system shown in FIG. 7.

FIG. 8 is a functional block diagram showing means for realizing the function of the main control section which forms the wireless telephone system shown in FIG. 7. In FIG. 8, reference numeral 9B denotes the main control section, numeral 91 denotes communication controlling means, numeral 92 denotes timer setting means, numeral 93 denotes timer time inputting means, and numeral 94 denotes message transmitting means. Since these components are similar to those shown in FIG. 2, the components are denoted by the same reference numerals as those used in FIG. 2 and the explanation thereof will be omitted. Numeral 96 denotes name reading means for reading names which are stored in the name storing memory 15 beforehand. A method of storing names into the name storing memory 15 will be mentioned later on in conjunction with the subsequent embodiment (or a fourth embodiment).

Figure 9:
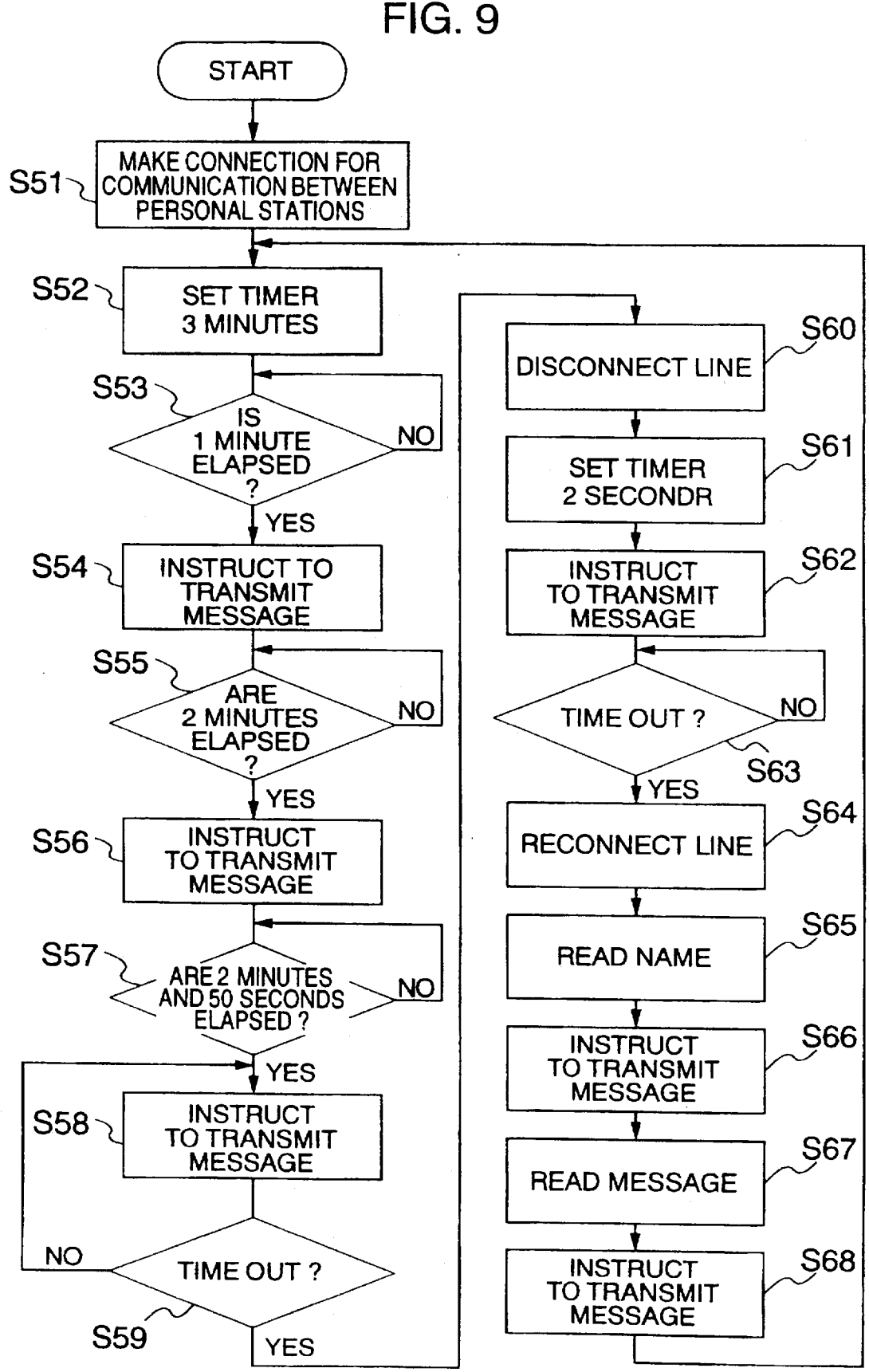
FIG. 9 is a flow chart for explaining the operation of the wireless telephone system according to the third embodiment of the present invention.

The operation of the wireless telephone system having the above construction will now be explained in conjunction with a transceiver mode in which communication is made between wireless telephone systems. FIG. 9 is a flow chart for explaining the operation of the wireless telephone system according to the present embodiment. Since steps S51 to S64 and step S68 in FIG. 9 correspond to steps S1 to S14 and step S15 in FIG. 3 respectively, the explanation thereof will be omitted.

In step S64, the communication controlling means 91 causes the line control section 6 to make line reconnection. After the line reconnection, the name reading means 96 reads data of a name (for example, "SUZUKI") stored beforehand in the name storing memory 15 (name reading step S65) to output the read name data to the message transmitting means 94. The message transmitting means 94 instructs the message transmitting section 7 to output the name data (step S66). Thereby, the message transmitting section 7 extracts voice data concerning the name data from the message table section 8 to transmit the extracted voice data to the voice processing section 3 (third message transmitting step). The voice processing section 3 outputs the voice data to the radio section 2 and the speaker 5. Thereby, the name is voice-outputted on both an outgoing (or calling) side and an incoming (or called) side. Next, the message transmitting means 94 instructs the message transmitting section 7 to transmit a voice message of "SAN, PLEASE START COMMUNICATION" ("SAN" in Japanese is a post-fixed honorary term corresponding to a front-fixed term "MR.", "MISS." or "MRS." in English) so that the message transmitting section 7 extracts data corresponding to the voice message from the message table section 8 (step S67) and outputs the extracted data to the voice processing section 3 (third message transmitting step S68). Then, the flow goes to step 52. Since the operations of steps S66, S67 and S68 are performed at the substantially same time, the voice message is heard in such a continuous form as "SUZUKI SAN, PLEASE START COMMUNICATION". Also, the message transmitting means 94 may operate so that the voice message of "SUZUKI SAN, PLEASE START COMMUNICATION" is displayed on the display section 16.

According to the present embodiment mentioned above, a message including a name is outputted at the time of line reconnection. Therefore, the notice of the name of a communicator of the opposite wireless telephone system can be given, thereby making it possible to smoothly start communication with the opposite wireless telephone system at the time of line reconnection.

(Embodiment 4)

Figure 10:
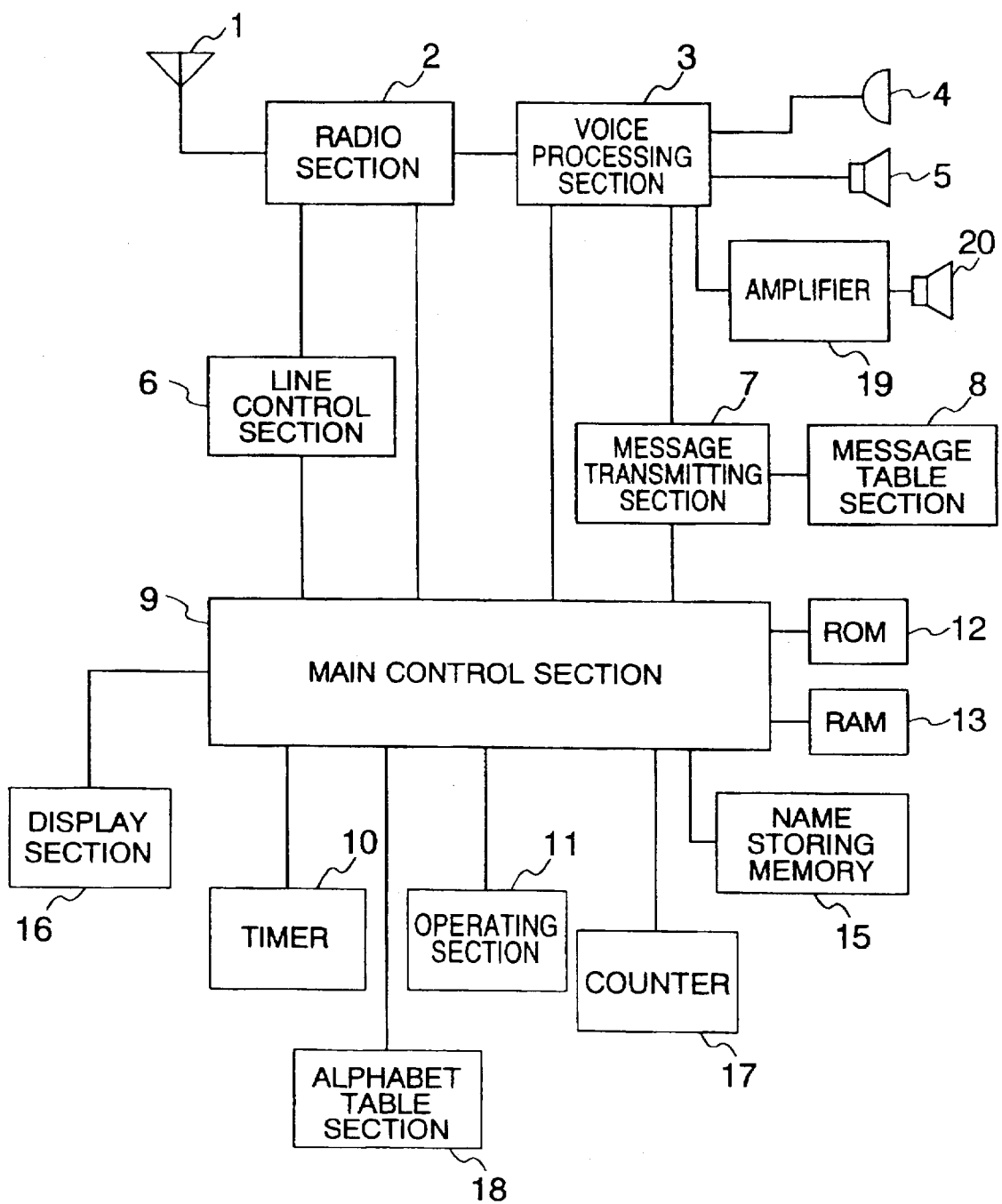
FIG. 10 is a block diagram showing the construction of a wireless telephone system according to a fourth embodiment of the present invention.

FIG. 10 is a block diagram showing the construction of a wireless telephone system according to a fourth embodiment of the present invention. The wireless telephone system according to the present embodiment is a system in which names to be used at the time of communication can be stored beforehand. In FIG. 10, reference numeral 1 denotes an antenna, numeral 2 denotes a radio section, numeral 3 denotes a voice processing section, numeral 4 denotes a microphone, numeral 5 denotes a speaker, numeral 6 denotes a line control section, numeral 7 denotes a message transmitting section, numeral 8 denotes a message table section, numeral 9 denotes a main control section, numeral 10 a timer, numeral 11 denotes an operating section, numeral 12 denotes a ROM, numeral 13 denotes a RAM, numeral 15 denotes a name storing memory, and numeral 16 denotes a display section. Since these components are similar to those shown in FIG. 7, the components are denoted by the same reference numerals as those used in FIG. 1 and the explanation thereof will be omitted. Numeral 17 denotes a counter for making the setting of "1" and the count-up by instructions of the main control section 9, numeral 18 denotes an alphabet table section in which data of alphabetical single characters is stored, numeral 19 denotes an amplifier for amplifying a voice signal from the voice processing section 3, and numeral 20 denotes a speaker for outputting the voice signal from the amplifier 19 as a voice. The voice processing section 3 outputs a voice signal to the speaker 5 or the amplifier 19 by an instruction from the main control section 9 through the message transmitting section 7.

Figure 11:
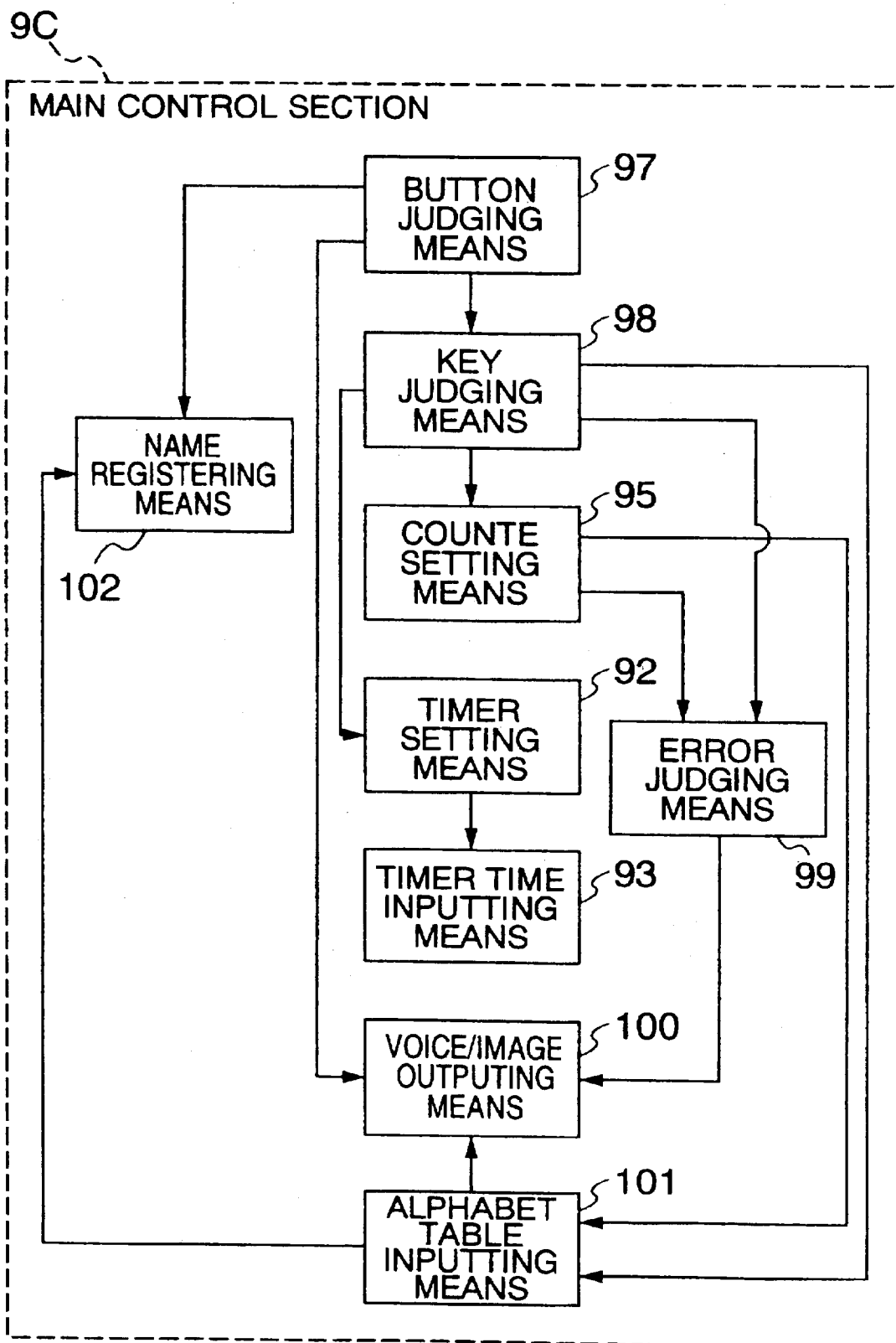
FIG. 11 is a functional block diagram showing means for realizing the function of a main control section of the wireless telephone system shown in FIG. 10.

FIG. 11 is a functional block diagram showing means for realizing the function of the main control section 9C which forms the wireless telephone system shown in FIG. 10. In FIG. 11, reference numeral 92 denotes timer setting means, numeral 93 denotes timer time inputting means, and numeral 95 denotes counter setting means. Since these components are similar to those shown in FIG. 5, the components are denoted by the same reference numerals as those used in FIG. 5 and the explanation thereof will be omitted. Numeral 97 denotes button judging means for judging which one of buttons is pushed, numeral 98 denotes key judging means for judging which one of keys is pushed, numeral 99 denotes error judging means for judging the presence/absence of an error on the basis of a count value in the counter setting means 95, numeral 100 denotes voice/image outputting means for outputting voice/image data indicative of an error when the error judging means 99 determines the presence of the error and outputting a character inputted by alphabet table inputting means 101, numeral 101 denotes the alphabet table inputting means for inputting a character from the alphabet table section 18 on the basis of the value of a numerical key checked by the key judging means 98 and a count value set by the counter setting means 95, and numeral 102 denotes name registering means for registering a name from the alphabet table inputting means 101 when the button judging means 97 judges a correction button 102a (which will be mentioned later on) as being not pushed and an acknowledge button 103 (which will be mentioned later on) as being pushed.

Figure 12:
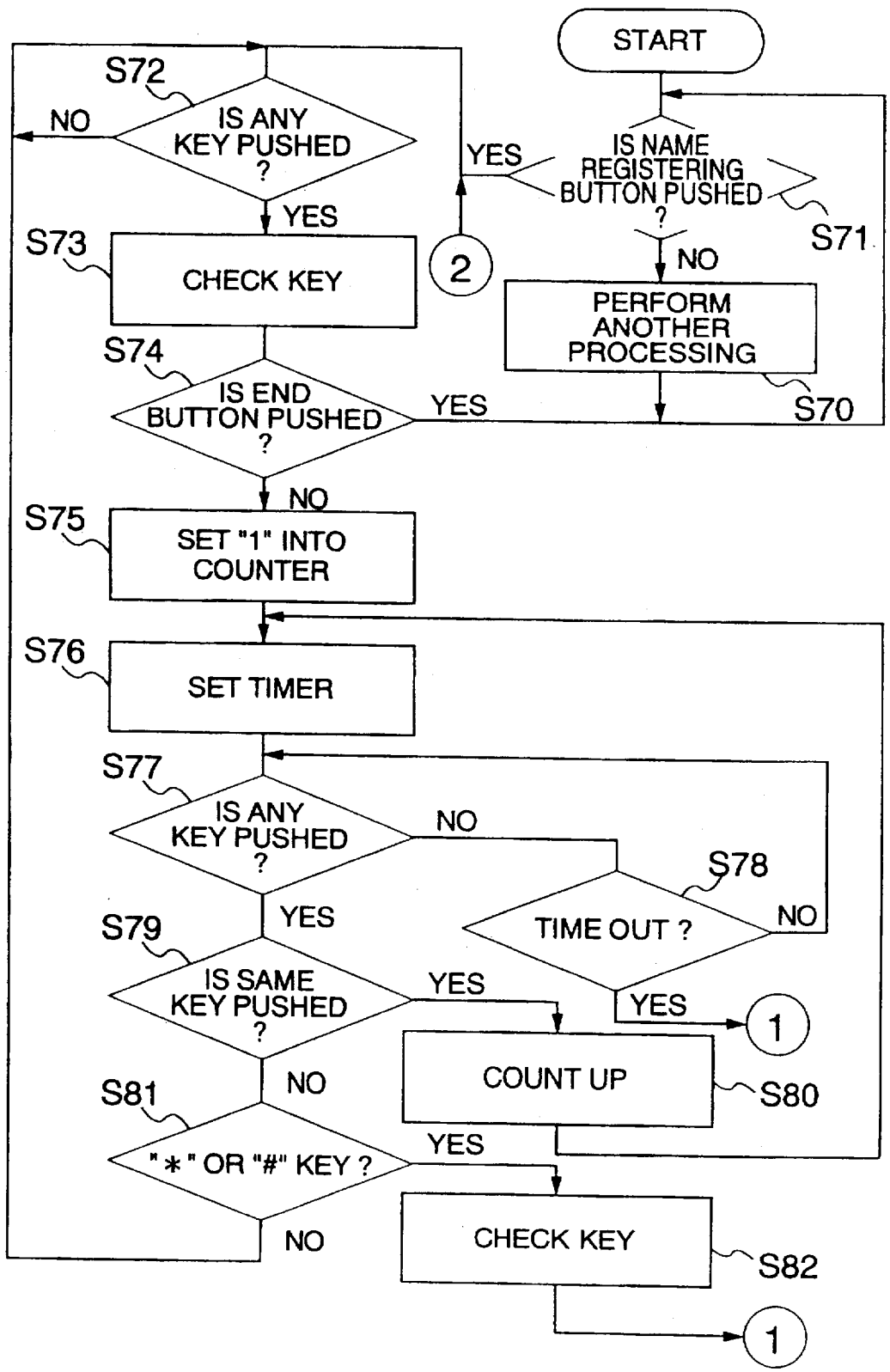
FIG. 12 is a part of a flow chart for explaining the operation of the wireless telephone system according to the fourth embodiment of the present invention.
Figure 13:
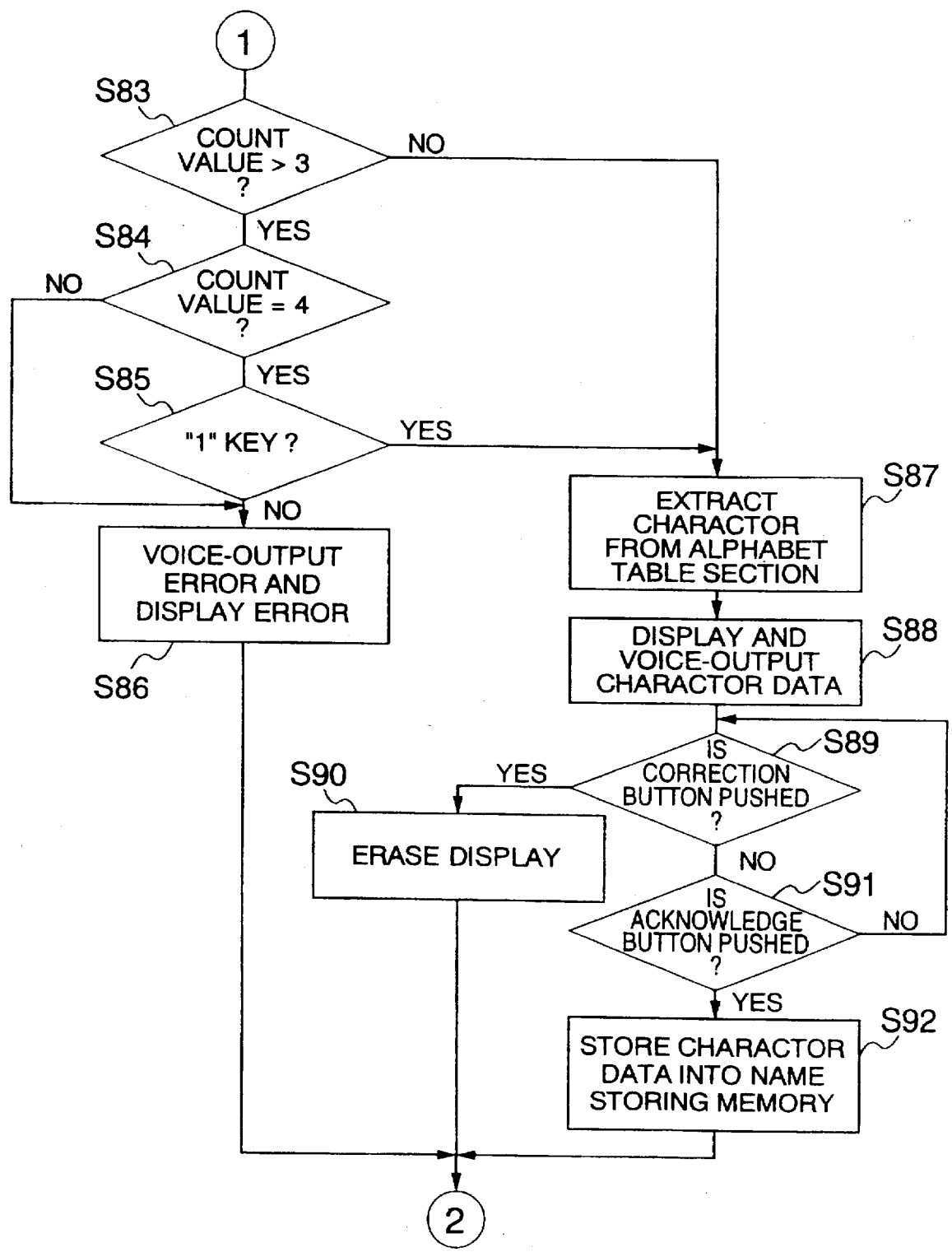
FIG. 13 is the remaining part of the flow chart for explaining the operation of the wireless telephone system according to the fourth embodiment of the present invention.

FIGS. 12 and 13 show as a whole a flow chart for explaining the operation of the fourth embodiment. Before explaining the operation of the wireless telephone system shown in FIGS. 10 and 11 by use of FIGS. 12 and 13, explanation will be made of FIGS. 14 to 16.

Figure 15:
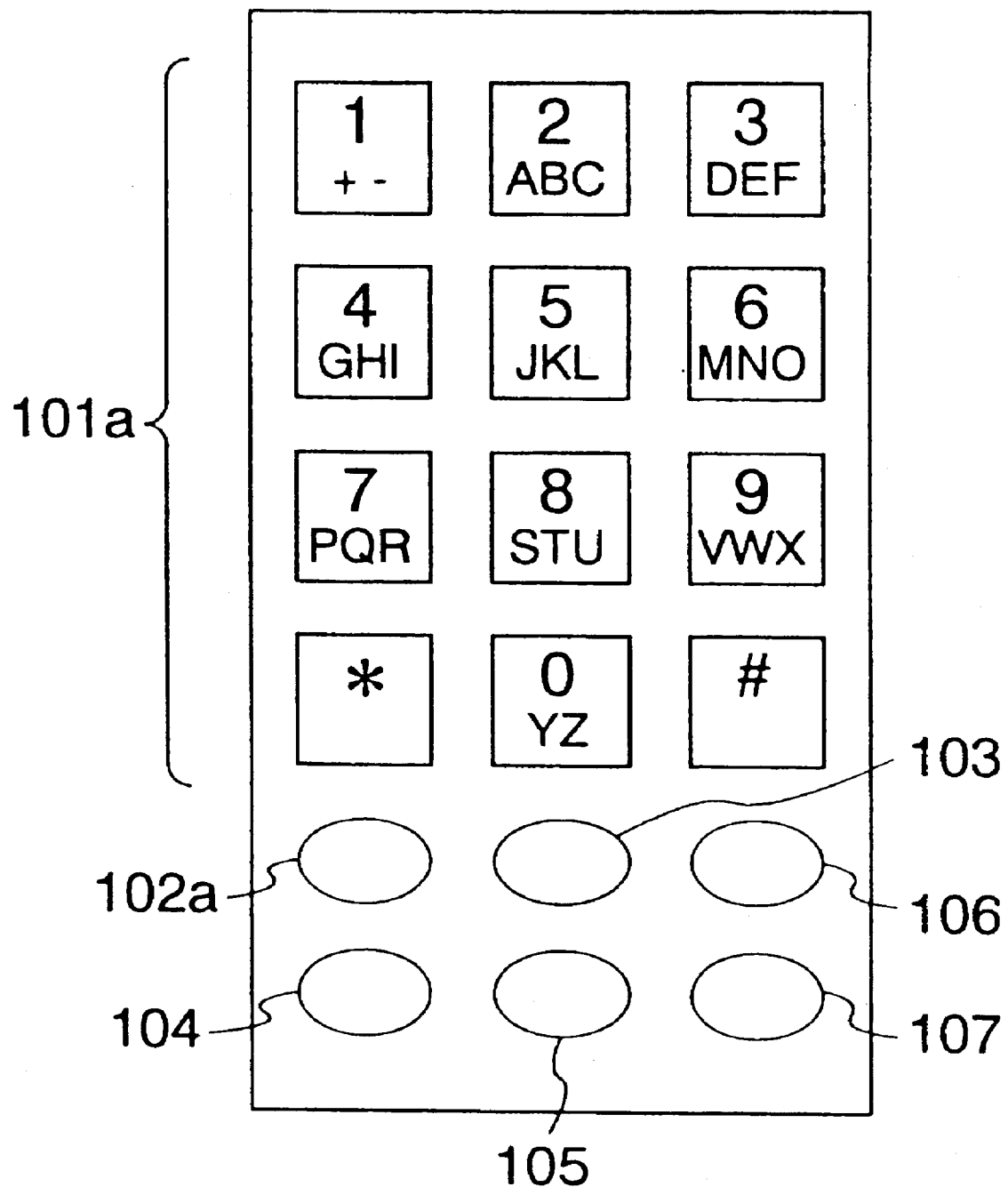
FIG. 15 is a diagram showing the arrangement of numerical keys and push buttons in the wireless telephone system according to the fourth embodiment of the present invention.
Figure 16:
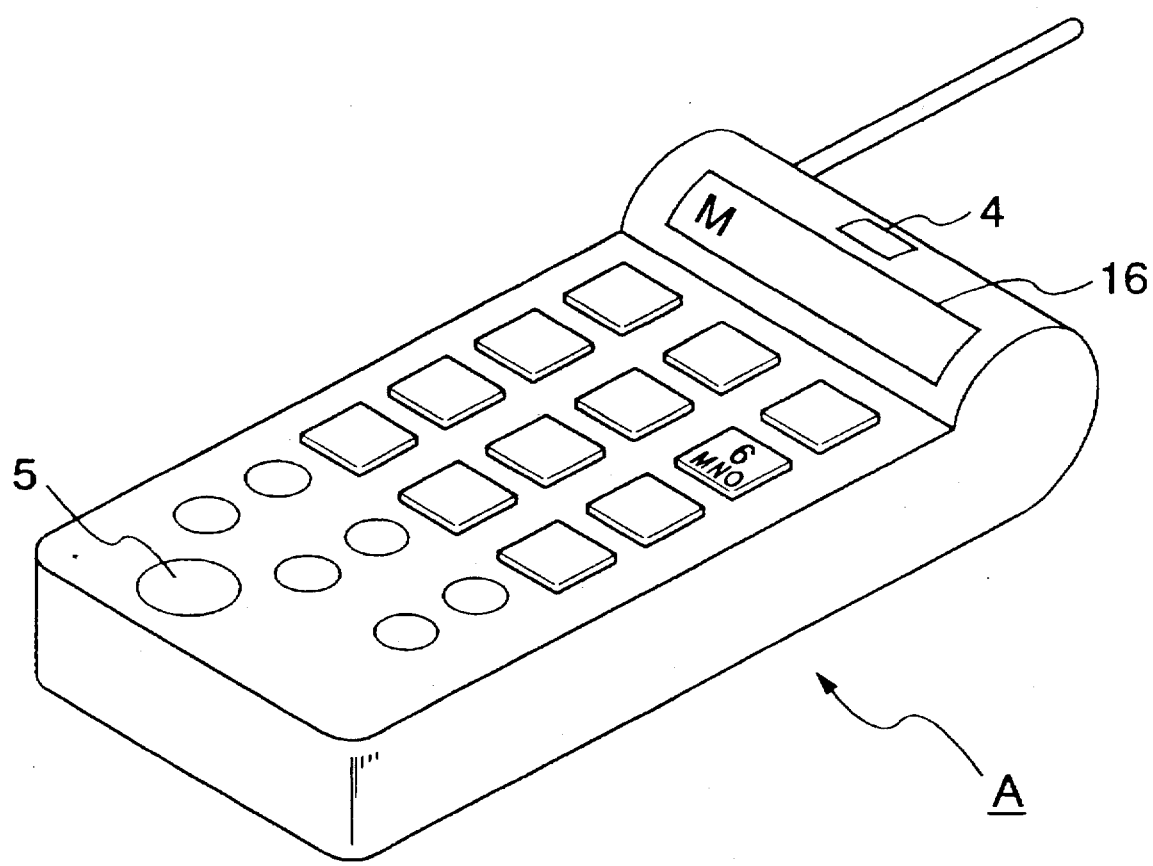
FIG. 16 is a perspective view showing an example of the wireless telephone system according to the fourth embodiment of the present invention.

FIG. 14 is a diagram showing the state of data stored in the alphabet table section 18. FIG. 15 is a diagram showing the arrangement of numerical keys and push buttons. FIG. 16 is a perspective view showing an example of the wireless telephone system. In FIG. 14, the horizontal direction represents the values of numerical keys and the vertical direction represents the count value of the counter 17. For example, when the pushed numerical key is "7" and the count value is "3", it is shown that "R" is selected. The count value assumes "2" if the same key is pushed two times and "3" if the same key is pushed three times.

In FIG. 15, reference numeral 101a denotes numerical keys of "0" to "9", "*" and "#", numeral 102a a denotes correction button for correcting name data to be stored, numeral 103 denotes an acknowledge button for acknowledging a name to be stored, numeral 104 denotes an end button for completing a name registering operation, numeral 105 denotes a name registering button for performing the name registering operation, numeral 106 denotes a hook button for off-hook, and numeral 107 denotes a communication button. In FIG. 16, reference symbol A denotes a wireless telephone system, numeral 4 denotes a microphone for voice input, and numeral 5 denotes a speaker for voice output.

The operation of the wireless telephone system having the above construction will now be explained in conjunction with a transceiver mode in which communication is made between wireless telephone systems. Referring to FIG. 12, the button judging means 97 judges whether or not the name registering button 105 is pushed (step S71). In the case where it is determined that the name registering button 105 is not pushed, another processing is performed (step S70). In the case where it is determined that the name registering button 105 is pushed, the key judging means 98 judges whether or not any numerical key is pushed (step S72). When it is determined that no numerical key is pushed, a waiting condition is taken until any numerical key is pushed. When it is determined that any numerical key is pushed, the key judging means 98 checks which one of numerical keys is pushed (step S73). Next, the button judging means 97 judges whether or not the end button 104 is pushed (step S74). In the case where it is determined that the end button 104 is pushed, the flow returns to step 71. In the case where it is determined that the end button 104 is not pushed, the counter setting means 95 sets the counter 17 to "1" (step S75) and the timer setting means 92 sets a predetermined time (for example, one second) into the timer 10 (step S76). Next, the key judging means 98 judges again whether or not any numerical key is pushed (step S77). When it is determined that no numerical key is pushed, the timer time input means 93 judges whether or not the timer time of the timer 10 is out, that is, whether or not there is the lapse of one second (step S78). In the case where there is not the lapse of one second, the flow returns to step S77 for numerical key judgement. In the case where there is the lapse of one second, the flow goes to step S83 on the assumption that the content of the numerical key is settled. When it is determined in step S77 that any numerical key is pushed, the key judging means 98 judges whether or not the pushed numerical key is the same as that pushed in step S72 (step S79). In the case where the same numerical key is pushed, the counter setting means 96 causes the count-up of the counter 17 (step S80) and the flow returns to step S76. Accordingly, if the same numerical key is pushed two times, the count value assumes "2". If the same numerical key is pushed three times, the count value assumes "3". In the case where the number of times of push of a numerical key is only one, the timer time becomes out and the flow goes to step S83 (steps S77, S78 and S83).

Next, in the case where it is determined in step S76 that the same numerical key is not pushed, the judgement is made of whether or not the pushed numerical key is either "*" or "#" (step S81). When the pushed numerical key is neither "*" nor "#", the flow returns to step S72 under the judgement as being an erroneous operation.

When the pushed numerical key is either "*" or "#", the key judging means 98 makes the key checking of whether it is "*" or "#" (step S82). In the case where it is determined that the operation of the wireless telephone system A is correct, the flow goes to step S83.

Referring to FIG. 13, the counter setting means 95 judges whether or not the set count value is beyond "3" (step S83). In the case where it is determined that the count value is beyond "3", the counter setting means 95 further judges whether or not the count value is "4" (step S84). When it is determined that the count value is "4", the key judging means 98 judges whether or not the value of the pushed numerical key is "1", that is, whether or not "SPACE" is intended, as apparent from FIG. 14 (step S85). In the case where the value of the numerical key is "1", the flow goes to step S87. In the case where it is determined in step S84 that the count value is not "4" or in the case where it is determined in step S85 that the value of the numerical key is not "1", the error judging means 99 makes the judgement as being an error and the voice/image outputting means 100 outputs a voice and an image indicating the error (step S86). The voice/image outputting means 100 causes the message transmitting section 7 to extract voice data of "ERROR. PLEASE PUSH AGAIN" from the message table section 8 so that the extracted voice data is sent to the voice processing section 3. At this time, the voice/image outputting means 100 instructs the voice processing section 3 to output a voice signal to the amplifier 19. The image is displayed on the display section 16. Thereby, the voice data from the message transmitting section 7 is D/A converted by the voice processing section 3, thereafter amplified by the amplifier and outputted as a voice by the speaker 20.

In step S87, the alphabet inputting means 101 extracts a corresponding character from the alphabet table section 18 on the basis of the numerical key value in steps S73 and S82 and the count value. For example, in the case where the key value is judged as "2" in step S73 and "#" in step S82 and the count value is "3", a small character (or lowercase letter) "c" is selected, as apparent from FIG. 14. Next, the voice/image outputting means 100 displays the extracted character data on the display section 16 and instructs the message transmitting section 7 to extract voice data corresponding to the character data from the message table section 8 so that the message transmitting section 7 sends the extracted voice data to the voice processing section 3 (step S88). Thereby, a voice corresponding to the character data extracted from the alphabet table section 18 is outputted from the speaker 20. Next, the button judging means 97 judges whether or not the correction button 102a is pushed (step S89). In the case where it is determined that the correction button 102a is pushed, the display on the display section 16 is erased (step S90) and the flow returns to step S72. In the case where it is determined that the correction button 102a is not pushed, the button judging means 97 next judges whether or not the acknowledge button 103 is pushed (step S91). In the case where it is determined that the acknowledge button 103 is not pushed, the flow returns to step S89. In the case where it is determined that the acknowledge button 103 is pushed, the character data of a name extracted from the alphabet table section 18 is stored into the name storing memory 15 (step S92) and the flow returns to step S72.

For example, in the case where the name of "MATSUSHITA" is to be stored, the name registering button 105 is pushed and the numerical key "6" is pushed once. At this time, it will be apparent from FIG. 14 that "M" is displayed and voice-outputted after the lapse of one second. Then, the acknowledge button 103 is pushed so that "M" is stored into the name storing memory 15. Next, the numerical key "2" is pushed once. At this time, it will be apparent from FIG. 14 that "A" is displayed and voice-outputted. Then, the acknowledge button 103 is pushed so that "A" is stored into the name storing memory 15. Subsequently, similar operations are performed for the other alphabets. When it is desired to complete the processing, the end button 104 is pushed.

According to the present embodiment mentioned above, it is possible to easily store (or register) names into the name storing memory 15 as data by operating an operating panel of the wireless telephone system A having numerical keys, push buttons and so forth arranged thereon. Therefore, the name registered in the name storing memory 15 can be read and used as a message at the time of line reconnection to inform the opposite wireless telephone system of the name of the opposite communicator, thereby making it possible to smoothly start communication with the opposite wireless telephone system at the time of line reconnection.

In the case of the foregoing embodiments where, the opposite wireless telephone system is also provided with a function of transmitting a similar message, the message from the opposite side and a message from the message transmitting section 7 will be outputted from the speaker 4 in a doubled state, so that the message becomes very hard to hear.

In order to cope with such a situation, the inconvenience can be avoided by stopping the message transmission from one of the two wireless telephone systems in the case where it is found that the opposite wireless telephone system also has a message transmitting function.

In order to confirm whether or not the opposite side has such a message transmitting function, the main control section 9 of a wireless telephone system capable of message transmission can control the radio section 2 in accordance with (or subsequent to) line connection to transmit a signal indicating that message transmission is possible. In the case where such a message transmission possibility indicating signal is received from the opposite wireless telephone system, the receiving wireless telephone system can recognize that the opposite wireless telephone system has a message transmitting function.

In this case, if both the wireless telephone systems transmit the message transmission possibility indicating signal, may arise a situation in which a message is outputted from neither of the wireless telephone systems. Therefore, a useful construction can be employed where an operation concerning the message transmitting section 7 is stopped when the radio section 2 receives a message transmission possibility indicating signal from the opposite wireless telephone system before the transmission of a message transmission possibility indicating signal by itself. Inversely, another useful construction in may be employed where an operation concerning the message transmitting section 7 is not stopped even if the radio section 2 receives a message transmission possibility indicating signal from the opposite wireless telephone system after the transmission of a message transmission possibility indicating signal by itself. In any case, it necessarily follows that one of the wireless telephone systems with an earlier transmission of the message transmission possibility indicating signal transmits messages. It is needless to say that the above establishment may be reversed. Namely, one of the wireless telephone systems with a later transmission the message transmission possibility indicating signal transmits messages.

The situation in which a message may be outputted from neither of the wireless telephone systems, if both the wireless telephone systems transmit the message transmission possibility indicating signal, can also be avoided in such a manner that wireless telephone systems are provided with orders of preference and the transmission/reception of information concerning the order of preference are performed in accordance with line connection so that only one of the wireless telephone systems having a higher order of preference transmits messages. In this case too, it is needless to say that only one of the wireless telephone systems having a lower order of preference may transmit messages.

The doubling of an output from the opposite side and an output from the message transmitting section 7 can also be prevented by providing a construction in which an output from the message transmitting section 7 is not outputted from the voice processing section 3 or the radio section 2 so that the output from the message transmitting section 7 is not transmitted to the opposite side. In this case, however, when the opposite wireless telephone system has no message transmitting function, no message is transmitted to the opposite telephone system. This situation can be avoided by providing a construction in which no output is made to the opposite telephone system only when it is recognized by use of the above-mentioned recognizing methods or the like that the opposite wireless telephone system has a message transmitting function.

In the present invention mentioned above, a message is transmitted in accordance with a situation under communication when direct communication is made between wireless telephone systems. Therefore, even in the case where the direct communication is made between the wireless telephone systems each including a changing communication situation under communication, a user can grasp the changing situation, thereby making it possible to progress the conversation smoothly.

Also, a message indicating that the line will be disconnected is transmitted at a predetermined time before the lapse of a time from the line connection until the line disconnection. Therefore, before the communication is cut, a user can know that the line will be disconnected. Thereby, it is possible to prevent the generation of a situation in which an important matter may be spoken during a period of time from the line disconnection until the line reconnection.

Further, a message indicating that the line is disconnected is transmitted during the time from the line disconnection until the line reconnection. Therefore, a user can know that the communication has been cut. Thereby, it is possible to prevent the conversation from being made in such a time zone.

Also, a message indicating line reconnection is transmitted when the line reconnection is to be made. Therefore, a user can know the reconnection, thereby making it possible to restart the conversation smoothly after the reconnection.

Further, a message urging the start of the conversation may be outputted when the line reconnection is to be made. Therefore, a user can grasp the timing of starting to talk. At this time, a user to start talking can be designated. Thereby, it is possible to prevent a situation in which after the line reconnection, both of the users start to talk or fall silent.

Also, a message indicating an elapsed time or the remaining time is transmitted after the lapse of every fixed time from the line connection or through a predetermined operation. Therefore, a user can make a communication while being conscious of how much time remains until the line will be disconnected. Thereby, it is possible to progress the conversation smoothly.

Further, in the case where the opposite wireless telephone system also has a message transmitting function, the message transmission from one of both the wireless telephone systems is stopped or an output of the message transmitting section is not transmitted to the opposite wireless telephone system. Therefore, it is possible to prevent both of the wireless telephone systems from outputting messages in a doubled form. As a result, there is eliminated a fear that a message becomes hard to hear due to the doubling of the message.

What is claimed is:

1. A wireless telephone apparatus comprising:
   a radio section for performing communication with another telephone apparatus via a cell station in a first mode and performing direct communication with another wireless telephone apparatus in a second mode;
   a signal processing section for processing a reception signal received by said radio section and a transmission signal to be transmitted by said radio section and for outputting at least one information signal as to connection and disconnection of the direct communication; and a control section for controlling said radio section to (i) disconnect the direct communication after a first predetermined time has elapsed from the connection of the direct communication with another wireless telephone apparatus and (ii) reconnect the direct communication with said another wireless telephone apparatus after a second predetermined time has elapsed from the disconnection of the direct communication, and for controlling said signal processing section to output said at least one information signal in accordance with the controlled situation of the direct communication.

2. A wireless telephone apparatus according to claim 1, wherein:

said at least one information signal includes at least one of an electric sound and a voice message.

3. A wireless telephone apparatus according to claim 1, wherein:

said at least one information signal indicates that the disconnection of the direct communication will soon be made; and said control section controls the output of said signal processing section so that said information signal is output at a third predetermined time before the lapse of the first predetermined time.

4. A wireless telephone apparatus according to claim 3, wherein:

said control section controls said signal processing section to output said information signal only once before the lapse of the first predetermined time.

5. A wireless telephone apparatus according to claim 3, wherein:

said control section controls said signal processing section to output said information signal repeatedly in a time period from the third predetermined time until the first predetermined time has elapsed.

6. A wireless telephone apparatus according to claim 1, wherein:

said at least one information signal includes a first information signal indicating that the disconnection of the direct communication will soon be made and a second information signal indicating that the disconnection of the direct communication has been executed; and said control section controls said signal processing section to (i) output said first information signal at a third predetermined time before the lapse of the first predetermined time and (ii) output said second information signal in accordance with the disconnection of the direct communication after the first predetermined time has elapsed.

7. A wireless telephone apparatus according to claim 6, wherein:

said control section controls said signal processing section to output said first information signal repeatedly from the third predetermined time until the first predetermined time has elapsed.

8. A wireless telephone apparatus according to claim 6, wherein:

said control section controls said signal processing section to output each of the first and second information signals as a voice message.

9. A wireless telephone apparatus according to claim 8, wherein:

said control section controls said signal processing section to output said first information signal repeatedly from the third predetermined time until the first predetermined time has elapsed.

10. A wireless telephone apparatus according to claim 6, wherein:

said control section controls the output of said signal processing section so that said first information signal is output as a voice message and said second information signal is output as one of an electric sound and a voice message.

11. A wireless telephone apparatus according to claim 10, wherein:

said control section controls said signal processing section to output said first information signal repeatedly from the third predetermined time until the first predetermined time has elapsed.

12. A wireless telephone apparatus according to claim 6, wherein:

said control section controls the output of said signal processing section so that said first information signal is output as an electric sound and said second information signal is output as a voice message.

13. A wireless telephone apparatus according to claim 12, wherein:

said control section controls said signal processing section to output said first information signal repeatedly from the third predetermined time until the first predetermined time has elapsed.

14. A wireless telephone apparatus according to claim 1, wherein:

said at least one information signal indicates count-down; and said control section controls said signal processing section to output said information signal from a third predetermined time until the first predetermined time has elapsed.

15. A wireless telephone apparatus according to claim 14, wherein:

said signal processing section stores therein a message indicating that the disconnection of the direct communication has been executed; and said control section controls said signal processing section to output said message in accordance with the disconnection of the direct communication when the first predetermined time has elapsed.

16. A wireless telephone apparatus according to claim 1, wherein:

said at least one information signal indicates that the direct communication is disconnected; and said control section controls said signal processing section to output said information signal in a time period from the disconnection of the direct communication until the reconnection of the direct communication.

17. A wireless telephone apparatus according to claim 1, wherein:

said at least one information signal indicates the reconnection of the direct communication; and said control section controls said signal processing section to output said information signal when the direct communication is to be reconnected.

18. A wireless telephone apparatus according to claim 17, further comprising:

a memory for storing a name therein, wherein:

said signal processing section outputs a voice message corresponding to the name stored in said memory; and said control section controls said signal processing section to output said voice message when the direct communication is to be reconnected.

19. A wireless telephone apparatus according to claim 18, further comprising:

an operating section for storing the name into said memory.

20. A wireless telephone apparatus according to claim 18, wherein:

said signal processing section outputs a message urging a start of conversation.

21. A wireless telephone apparatus according to claim 17, further comprising:

a memory for storing a name therein, wherein:
said signal processing section outputs a voice message corresponding to the name stored in said memory; and
said control section controls said signal processing section to output a combined voice message in which a message urging a start of conversation is added to a voice message indicating when the direct communication is to be reconnected.

22. A wireless telephone apparatus according to claim 21, further comprising:

an operating section for storing the name into said memory.

23. A wireless telephone apparatus according to claim 1, wherein:

said at least one information signal indicates an elapsed time; and
said control section controls said signal processing section to output said information signal after each lapse of a fourth predetermined time from the connection of the direct communication, said fourth predetermined time being shorter than said first predetermined time.

24. A wireless telephone apparatus according to claim 1, wherein:

said at least one information signal indicates a remaining time until the disconnection of the direct communication; and
said control section controls said signal processing section to output said information signal after each lapse of a fourth predetermined time from the connection of the direct communication, said fourth predetermined time being shorter than said first predetermined time.

25. A wireless telephone apparatus according to claim 1, further comprising:

an operating section for performing an operation of instructing a notice of an elapsed time from the connection of the direct communication, wherein:
said at least one information signal indicates the elapsed time; and
said control section controls said signal processing section to output said information signal in accordance with the operation of said operating section.

26. A wireless telephone apparatus according to claim 1, further comprising:

an operating section for performing an operation of instructing a notice of a remaining time until the disconnection of the direct communication, wherein:
said at least one information signal indicates the remaining time; and
said control section controls said signal processing section to output said information signal in accordance with the operation of said operating section.

27. A wireless telephone apparatus according to claim 1, wherein:

said control section stops said signal processing section from outputting said at least one information signal if said control section recognizes that said another wireless telephone apparatus is capable of outputting at least one information signal as to the connection and the disconnection of the direct communication.

28. A wireless telephone apparatus according to claim 27, wherein:

said control section controls said radio section in accordance with the connection of the direct communication to transmit a signal indicating that said wireless telephone apparatus is capable of outputting said at least one information signal.

29. A wireless telephone apparatus according to claim 27, wherein:

said radio section receives from said another wireless telephone apparatus a signal indicating that said another wireless telephone apparatus is capable of outputting said at least one information signal, thereby allowing said control section to recognize the outputting capabilities of said another wireless telephone apparatus.

30. A wireless telephone apparatus according to claim 29, wherein:

said control section controls said radio section in accordance with the connection of the direct communication to transmit a signal indicating that said wireless telephone apparatus is capable of outputting said at least one information signal.

31. A wireless telephone apparatus according to claim 30, wherein:

after said radio section transmits the signal indicating that said wireless telephone apparatus is capable of outputting said at least one information signal, said control section controls said signal processing section not to stop outputting said at least one information signal even if said radio section receives from said another wireless telephone apparatus the signal indicating that said another wireless telephone apparatus is capable of outputting said at least one information signal.

32. A wireless telephone apparatus according to claim 30, wherein:

said control section stops said signal processing section from outputting said at least one information signal only if said radio section receives from said another wireless telephone apparatus the signal indicating that said another wireless telephone apparatus is capable of outputting said at least one information signal before said radio section transmits the signal indicating that said wireless telephone apparatus is capable of outputting said at least one information signal.

33. A wireless telephone apparatus according to claim 32, wherein:

after said radio section transmits the signal indicating that said wireless telephone apparatus is capable of outputting said at least one information signal, said control section controls said signal processing section not to stop outputting said at least one information signal even if said radio section receives from said another wireless telephone apparatus the signal indicating that said another wireless telephone apparatus is capable of outputting said at least one information signal.

34. A wireless telephone apparatus according to claim 1, wherein:

each wireless telephone apparatus is provided with a priority order; and said control section controls said signal processing section to stop outputting said at least one information signal in accordance with a relationship of said priority order between said wireless telephone apparatus and said another wireless telephone apparatus.

35. A wireless telephone apparatus according to claim 34, wherein:

said control section controls said radio section to transmit and receive information concerning said priority order to and from said another wireless telephone apparatus in accordance with the connection of the direct communication.

36. A wireless telephone apparatus according to claim 1 wherein:

said radio section of said wireless telephone apparatus does not transmit said at least one information signal to said another wireless telephone apparatus.

37. A wireless telephone apparatus according to claim 1, wherein:

said control section controls said radio section to output said at least one information signal only if the connection with said another wireless telephone apparatus originates from transmission of an outgoing call by said wireless telephone apparatus.

38. A wireless telephone apparatus according to claim 1, wherein:

said control section controls said radio section to output said at least one information signal only in the case where the connection with said another wireless telephone apparatus originates from reception of an incoming call into said wireless telephone apparatus.

39. A wireless telephone apparatus according to claim 34, wherein:

said control section controls said radio section not to transmit said at least one information signal to said another wireless telephone apparatus only in the case where said control section recognizes that said another wireless telephone apparatus is capable of outputting said at least one information signal.

40. A wireless telephone apparatus according to claim 39, wherein:

said control section recognizes that said another wireless telephone apparatus is capable of outputting said at least one information signal if said radio section receives from said another wireless telephone apparatus a signal indicating that said another wireless telephone apparatus is capable of outputting said at least one information signal.

41. A wireless telephone apparatus according to claim 40, wherein:

said control section controls said radio section in accordance with the connection of the direct communication to transmit a signal indicating that said wireless telephone apparatus is capable of outputting said at least one information signal.

42. A wireless telephone apparatus according to claim 16, wherein:

said at least one information signal includes at least one of an electric sound and a voice message.

43. A wireless telephone apparatus according to claim 16, wherein:

said first predetermined time is approximately three minutes; and said second predetermined time is approximately two seconds.

44. A wireless telephone apparatus for use by a first party during direct communication with a second party, comprising:

radio means for sending and receiving information during a telephone conversation;

a control section having means for disconnecting the telephone conversation if it has a duration that exceeds a predetermined duration, and means for reconnecting the conversation after the disconnection; and means, cooperating with the control section, for signaling the first party as to reconnection and disconnection of the direct communication at a first predetermined time before the conversation is disconnected and before the conversation is reconnected.

45. A wireless telephone apparatus according to claim 44, wherein:

said signaling means outputs during the first predetermined time a message indicating the amount of time elapsed during the conversation.

46. A wireless telephone apparatus according to claim 44, wherein said signaling means outputs a signal to said radio means which sends the signal to the second party.

47. A wireless telephone apparatus according to claim 44, wherein said signaling means includes a message table section containing a number of voice messages.

* * * * *